(12) United States Patent
Dietz

(10) Patent No.: US 11,460,577 B2
(45) Date of Patent: Oct. 4, 2022

(54) DISTANCE MEASURING DEVICE

(71) Applicant: Precitec Optronik GmbH, Neu-Isenburg (DE)

(72) Inventor: Christoph Dietz, Obertshausen (DE)

(73) Assignee: Precitec Optronik GmbH

( * ) Notice: Subject to any disclaimer, the term of this patent is extended or adjusted under 35 U.S.C. 154(b) by 985 days.

(21) Appl. No.: 16/184,222

(22) Filed: Nov. 8, 2018

(65) Prior Publication Data

US 2019/0137626 A1    May 9, 2019

(30) Foreign Application Priority Data

Nov. 9, 2017    (DE) .......................... 102017126310.1

(51) Int. Cl.
*G01S 17/48*    (2006.01)
*G01B 11/06*    (2006.01)
(Continued)

(52) U.S. Cl.
CPC .............. *G01S 17/48* (2013.01); *B24B 7/228* (2013.01); *B24B 49/12* (2013.01); *G01B 11/026* (2013.01);
(Continued)

(58) Field of Classification Search
CPC ......... B24B 49/12; B24B 7/228; G01B 11/06; G01B 11/0608; G01B 2210/50; G01B 11/026; G01B 9/02027; G01B 9/02077; G01S 17/48; G07D 11/16; G07D 11/50; G07D 2211/00; G07D 7/00; H01L 22/12
(Continued)

(56) References Cited

U.S. PATENT DOCUMENTS

| | | | |
|---|---|---|---|
| 4,861,131 A | 8/1989 | Bois et al. | |
| 5,276,631 A | 1/1994 | Popovic et al. | |

(Continued)

FOREIGN PATENT DOCUMENTS

| | | |
|---|---|---|
| CN | 101365375 | 2/2009 |
| CN | 101393015 | 3/2009 |

(Continued)

OTHER PUBLICATIONS

Schönleber, Martin; Notice of Allowance for U.S. Appl. No. 15/588,021, filed May 5, 2017, dated Feb. 15, 2018, 33 pgs.
(Continued)

*Primary Examiner* — Tri T Ton
(74) *Attorney, Agent, or Firm* — Taylor English Duma LLP

(57) ABSTRACT

A distance measuring device comprises a measuring head, the measuring head having an optical measuring system for carrying out an optical measurement process on a measurement object by means of at least one measuring light beam formed from a broad-band measuring light. The measuring head further has a liquid guide with a liquid inlet and a liquid outlet for producing a jet of liquid directed at the measurement object, the liquid guide being designed such that in certain sections at least the measuring light beam runs essentially along the jet of liquid. The measuring head further has a flow element with a laminar flow channel, the flow element being designed such that the at least one measuring light beam is able to reach the measurement object by passing through the laminar flow channel.

23 Claims, 6 Drawing Sheets

(51) Int. Cl.
  *G01B 11/02* (2006.01)
  *B24B 7/22* (2006.01)
  *B24B 49/12* (2006.01)
(52) U.S. Cl.
  CPC .......... *G01B 11/06* (2013.01); *G01B 11/0608* (2013.01); *G01B 2210/50* (2013.01)
(58) Field of Classification Search
  USPC .................. 356/356, 498–505, 600–640
  See application file for complete search history.

(56) References Cited

U.S. PATENT DOCUMENTS

| | | | |
|---|---|---|---|
| 5,392,124 A | 2/1995 | Barbee | |
| 5,532,815 A | 7/1996 | Kipman et al. | |
| 5,691,540 A | 11/1997 | Halle et al. | |
| 5,905,572 A | 5/1999 | Li | |
| 6,057,920 A | 5/2000 | Fercher et al. | |
| 6,098,895 A | 8/2000 | Walzel et al. | |
| 6,099,522 A | 8/2000 | Knopp et al. | |
| 6,396,069 B1 | 5/2002 | MacPherson et al. | |
| 6,628,397 B1* | 9/2003 | Nikoonahad | B24B 37/005 356/445 |
| 6,672,943 B2 | 1/2004 | Vogtmann et al. | |
| 6,673,654 B2 | 1/2004 | Ohno et al. | |
| 6,686,270 B1 | 2/2004 | Subramanian et al. | |
| 6,768,552 B2 | 7/2004 | Takahashi et al. | |
| 6,806,969 B2 | 10/2004 | Clifford, Jr. et al. | |
| 6,887,126 B2 | 5/2005 | Brouillette et al. | |
| 6,897,964 B2 | 5/2005 | Takahashi et al. | |
| 7,271,916 B2 | 9/2007 | Jasapara et al. | |
| 7,306,696 B2 | 12/2007 | Lian et al. | |
| 7,307,735 B2 | 12/2007 | Hecht et al. | |
| 7,443,517 B2 | 10/2008 | Sawabe et al. | |
| 7,477,401 B2 | 1/2009 | Marx et al. | |
| 7,525,732 B2 | 4/2009 | Uehara et al. | |
| 7,652,774 B2 | 1/2010 | Lian et al. | |
| 7,705,995 B1 | 4/2010 | Johs et al. | |
| 7,738,113 B1 | 6/2010 | Marx et al. | |
| 7,826,068 B2 | 11/2010 | Czerkas | |
| 7,853,429 B2 | 12/2010 | Fettig et al. | |
| 7,935,217 B2* | 5/2011 | Yashiki | H01L 21/67259 156/345.17 |
| 8,716,039 B2 | 5/2014 | Dusemund | |
| 8,982,339 B2 | 3/2015 | Schonleber et al. | |
| 9,295,391 B1* | 3/2016 | Tearney | A61B 5/0059 |
| 9,297,645 B2 | 3/2016 | Schonleber | |
| 9,494,409 B2 | 11/2016 | Schonleber | |
| 9,500,471 B2 | 11/2016 | Michelt | |
| 9,677,871 B2 | 6/2017 | Schonleber | |
| 9,982,994 B2 | 5/2018 | Schonleber et al. | |
| 10,228,551 B1 | 3/2019 | Dietz et al. | |
| 10,234,265 B2 | 3/2019 | Schönleber et al. | |
| 2002/0148983 A1 | 10/2002 | Inoue et al. | |
| 2002/0153500 A1 | 10/2002 | Fordahl et al. | |
| 2003/0016353 A1 | 1/2003 | Detalle et al. | |
| 2003/0090671 A1 | 5/2003 | Takahashi et al. | |
| 2004/0021874 A1 | 2/2004 | Shimmick | |
| 2004/0185582 A1 | 9/2004 | Kueny | |
| 2004/0262529 A1 | 12/2004 | Yoshida et al. | |
| 2005/0003642 A1 | 1/2005 | Hecht et al. | |
| 2005/0073692 A1 | 4/2005 | De Groot | |
| 2005/0140981 A1 | 6/2005 | Waelti | |
| 2005/0237537 A1 | 10/2005 | Leizerson et al. | |
| 2005/0248771 A1 | 11/2005 | Eussen et al. | |
| 2006/0132790 A1 | 6/2006 | Gutin | |
| 2006/0194419 A1 | 8/2006 | Araki | |
| 2007/0046948 A1 | 3/2007 | Podoleanu et al. | |
| 2007/0086018 A1 | 4/2007 | Shih et al. | |
| 2007/0148792 A1 | 6/2007 | Marx et al. | |
| 2007/0188765 A1 | 8/2007 | Zhao et al. | |
| 2007/0231717 A1 | 10/2007 | Rivers et al. | |
| 2007/0258095 A1 | 11/2007 | Oliver et al. | |
| 2008/0013078 A1 | 1/2008 | Podoleanu et al. | |
| 2008/0013960 A1 | 1/2008 | Tearney et al. | |
| 2008/0151237 A1 | 6/2008 | Lian et al. | |
| 2009/0031792 A1 | 2/2009 | Fan et al. | |
| 2009/0059239 A1 | 3/2009 | Hoffmann et al. | |
| 2009/0078888 A1 | 3/2009 | Namba et al. | |
| 2009/0128824 A1 | 5/2009 | Leitgeb et al. | |
| 2009/0250635 A1 | 10/2009 | Sykora et al. | |
| 2009/0257065 A1 | 10/2009 | Hauger et al. | |
| 2009/0262353 A1* | 10/2009 | Benvegnu | B24B 49/12 356/433 |
| 2009/0268020 A1 | 10/2009 | Buckland et al. | |
| 2009/0268209 A1 | 10/2009 | Waelti et al. | |
| 2009/0273782 A1 | 11/2009 | Yoo et al. | |
| 2010/0007894 A1 | 1/2010 | Suehira | |
| 2010/0051068 A1 | 3/2010 | Miyanari | |
| 2010/0110376 A1 | 5/2010 | Everett et al. | |
| 2010/0157308 A1 | 6/2010 | Xie | |
| 2010/0265493 A1 | 10/2010 | Jiang et al. | |
| 2010/0283842 A1 | 11/2010 | Guissin et al. | |
| 2010/0321671 A1 | 12/2010 | Marx et al. | |
| 2011/0085136 A1 | 4/2011 | Ferguson et al. | |
| 2011/0180521 A1 | 7/2011 | Quitter et al. | |
| 2011/0222070 A1 | 9/2011 | Nagai et al. | |
| 2011/0292375 A1 | 12/2011 | Marx et al. | |
| 2012/0050723 A1 | 3/2012 | Emtman et al. | |
| 2012/0200859 A1 | 8/2012 | Breitenstein et al. | |
| 2012/0206710 A1 | 8/2012 | Niemela et al. | |
| 2012/0238869 A1 | 9/2012 | Schmitt et al. | |
| 2012/0257207 A1 | 10/2012 | Marx et al. | |
| 2012/0257213 A1 | 10/2012 | Schonleber | |
| 2012/0320380 A1 | 12/2012 | Schonleber | |
| 2013/0034918 A1 | 2/2013 | Dusemund et al. | |
| 2013/0070732 A1 | 3/2013 | Noh et al. | |
| 2013/0120740 A1 | 5/2013 | Schonleber | |
| 2013/0162978 A1 | 6/2013 | Yazdanfar et al. | |
| 2014/0368830 A1 | 12/2014 | Michelt | |
| 2015/0260504 A1 | 9/2015 | Schonleber | |
| 2017/0227350 A1 | 8/2017 | Sarunic et al. | |
| 2017/0234678 A1 | 8/2017 | Schonleber et al. | |
| 2017/0301751 A1* | 10/2017 | Agata | H01L 29/66128 |
| 2018/0164089 A1 | 6/2018 | Schonleber et al. | |

FOREIGN PATENT DOCUMENTS

| | | |
|---|---|---|
| CN | 102209878 | 10/2011 |
| DE | 19525770 | 8/1996 |
| DE | 69622943 | 3/2003 |
| DE | 10319843 | 4/2004 |
| DE | 102004011189 | 9/2005 |
| DE | 102004052205 | 5/2006 |
| DE | 102005036719 | 2/2007 |
| DE | 60202８709 | 5/2007 |
| DE | 102005052743 | 5/2007 |
| DE | 102006034244 | 1/2008 |
| DE | 102007048295 | 4/2009 |
| DE | 102008041062 | 4/2009 |
| DE | 102010000079 | 1/2010 |
| DE | 102008049821 | 4/2010 |
| DE | 10325942 | 9/2010 |
| DE | 102010015944 | 7/2011 |
| DE | 102010016862 | 9/2011 |
| DE | 102011081596 | 4/2012 |
| DE | 102011051146 | 10/2012 |
| DE | 102011055735 | 5/2013 |
| DE | 102012111008 | 5/2014 |
| DE | 102013008269 | 11/2014 |
| DE | 202008018535 | 7/2015 |
| EP | 0547227 | 6/1993 |
| EP | 0905476 | 3/1999 |
| EP | 1018632 | 7/2000 |
| EP | 1977850 | 10/2008 |
| EP | 2159535 | 3/2010 |
| EP | 2076733 | 12/2012 |
| FR | 2950441 | 3/2011 |
| GB | 1105819 | 3/1968 |
| JP | 6065963 | 4/1988 |
| JP | H07311019 | 11/1995 |
| JP | H10335288 | 12/1998 |
| JP | 2001235311 | 8/2001 |
| JP | 200259364 | 2/2002 |

(56) References Cited

FOREIGN PATENT DOCUMENTS

| KR | 1020080112436 | 12/2008 |
|---|---|---|
| TW | 200712585 | 4/2007 |
| TW | 200937005 | 9/2009 |
| WO | 1997027613 | 7/1997 |
| WO | 2006028926 | 3/2006 |
| WO | 2006084279 | 8/2006 |
| WO | 2007060441 | 5/2007 |
| WO | 2008010996 | 1/2008 |
| WO | 2011086490 | 7/2011 |
| WO | 2011141867 | 11/2011 |
| WO | 2013070732 | 5/2013 |
| WO | 2014076649 | 5/2014 |

OTHER PUBLICATIONS

Schönleber, Martin; Ex Parte Quayle Action for U.S. Appl. No. 15/433,173, filed Feb. 15, 2017, dated Aug. 23, 2018, 30 pgs.
Schönleber, Martin; Notice of Allowance for U.S. Appl. No. 15/433,173, filed Feb. 15, 2017, dated Nov. 20, 2018, 15 pgs.
Dieiz, Christoph; German Examination Report for serial No. 10 2017 126 310.1, filed Nov. 9, 2017, dated Jul. 13, 2018, 14 pgs.
German Examination Report for German Application No. DE102013010030.5, filed Jun. 17, 2013, dated Feb. 28, 2014, 12 pgs.
ISIS Sentronics GmbH Data Sheet, "StraDex a3 sensor" and "StraDex f2-80 sensor head", publicly available prior to Oct. 11, 2012, 3 pgs.
Jakob, Dr. G., "Koaxiale Interferometrische Schichtdickenmessung", Optical Measuring, Sonderdruck aus Photonik Mar. 2000; 4 pgs.
Knuttel, Dr. Alexander; "Non-compact Roughness and 3D Topography Evaluation of grinded Wafers down to nm level", Dec. 1, 2010, 25 pgs.
Lucke, et al.; Article entitled: "Mikrooptische Sensoren nach dem chromatisch konfokalen Messprinzip", Forschungszentrum Karlsruhe GmbH, Karlsruhe 2006, 23 pgs.
Taiwan Office Action for serial No. 101121622, filed Jun. 15, 2012, dated May 21, 2014, 15 pgs.
Malta, D. et al.; "Fabrication of TSV-Based Silicon Interposers", RTI International, publicly available prior to Oct. 11, 2012, 6 pgs.
Mucro-Epsilon USA; Brochure for Confocal Chromatic Measurement System, cited in the German Examination Report for serial No. 10 2014 008 584.8, dated Apr. 21, 2016, 11 pgs.
"Micro-Epsilon; Article entitled: ""New Generation of Confocal Measurement Technology"", located at <http://www.microepsilon.com/press/release/PR231confocalDT/index.html?sLang=us>, accessed on Jul. 7, 2016, 2 pgs."
Niklaus, et al. "Adhesive Wafer Bonding", Journal of Applied Physics, Applied Physics Reviews—Focused Review, 2006, vol. 99, No. 1, pp. 031101.1-031101.28, 29 pgs.
Precitec Optronik GmbH; French Preliminary Search Report and Written Opinion for serial No. FR1253225, dated Nov. 13, 2013, 10 pgs.
Precitec Optronik GmbH; German Examination Report for serial No. 102014008584.8, dated Apr. 21, 2016, 13 pgs.
Rowland, et al. "Impact of polymer film thickness and cavity size on polymer flow during embossing: toward process design rules for nanoimprint lithography", Journal of Micromechanics and Microengineering, 2005, vol. 15, pp. 2414-2425, 12 pgs.
Precitec Optronik GmbH, Office Action for Chinese application No. 201811320266.9, filed Nov. 7, 2018, dated Jul. 1, 2020, 11 pgs.
Schoenleber; German Examination Report for serial No. DE102012102826, dated Sep. 28, 2012, 14 pgs.
Schonleber, Martin; Corrected Notice of Allowability for U.S. Appl. No. 13/440,434, filed Apr. 5, 2012, dated Mar. 1, 2016, 6 pgs.
Schonleber, Martin; Final Office Action for U.S. Appl. No. 13/440,434, filed Apr. 5, 2012, dated Feb. 10, 2014, 20 pgs.
Schonleber, Martin; Issue Notification for U.S. Appl. No. 13/440,434, filed Apr. 5, 2012, dated Mar. 9, 2016, 1 pg.
Schonleber, Martin; Non Final Office Action for U.S. Appl. No. 13/440,434, filed Apr. 5, 2012, dated Oct. 14, 2014, 16 pgs.
Schonleber, Martin; Non-Final Office Action for U.S. Appl. No. 13/440,434, filed Apr. 5, 2012, dated Jun. 25, 2015, 21 pgs.
Schonleber, Martin; Non-Final Office Action for U.S. Appl. No. 13/440,434, filed Apr. 5, 2012, dated Sep. 24, 2013, 34 pgs.
Schonleber, Martin; Notice of Allowance for U.S. Appl. No. 13/440,434, filed Apr. 5, 2012, dated Jan. 13, 2016, 11 pgs.
Schonleber, Martin; Notice of Allowance for U.S. Appl. No. 13/440,434, filed Apr. 5, 2012, dated Feb. 12, 2015, 9 pgs.
Schonleber, Martin; Notice of Allowance for U.S. Appl. No. 13/440,434, filed Apr. 5, 2012, dated Sep. 23, 2015, 11 pgs.
Schonleber; United Kingdom Search Report for serial No. GB1105819.5, filed Apr. 6, 2011, dated Jul. 23, 2012, 4 pgs.
Dusemund, Claus; Issue Notification for U.S. Appl. No. 13/521,736, filed Jul. 11, 2012, dated Apr. 16, 2014, 1 pg.
Dusemund, Claus; Non-Final Office Action for U.S. Appl. No. 13/521,736, filed Jul. 11, 2012, dated Jul. 23, 2013, 18 pgs.
Dusemund, Claus; Notice of Allowance for U.S. Appl. No. 13/521,736, filed Jul. 11, 2012, dated Dec. 27, 2013, 8 pgs.
Dusemund; International Preliminary Reporton Patentability for serial No. PCT/IB2011/050091, filed Jan. 10, 2011, dated Aug. 16, 2012, 14 pgs.
Dusemund; International Search Report and Written Opinion for serial No. PCT/IB2011/050091, filed Jan. 10, 2011, dated Apr. 12, 2011, 3 pgs.
Huang et al.; "Optical coherence tomography", Science, vol. 254, No. 5035, S. 1178-1181, published Nov. 22, 1991, 4 pgs.
Vakhtin et al.; "Common-path interferometer for frequency-domain optical coherence tomography"; Applied Optics, vol. 42, No. 34, S. 6953-6957, published Dec. 1, 2003, 6 pgs.
Extended European Search Report for serial No. EP12172165, dated Oct. 24, 2012, 5 pgs.
Precitec Optronik GmbH; Korean Notice of Preliminary Rejection for serial No. 10-2012-0064923, filed Mar. 18, 2012, dated Oct. 30, 2014, 11 pgs.
Schonleber, Martin; Applicant Interview Summary for U.S. Appl. No. 13/525,184, filed Jun. 15, 2012, dated Oct. 27, 2015, 3 pgs.
Schonleber, Martin; Final Office Action for U.S. Appl. No. 13/525,184, filed Jun. 15, 2012, dated Oct. 7, 2014, 17 pgs.
Schonleber, Martin; Final Office Action for U.S. Appl. No. 13/525,184, filed Jun. 15, 2012, dated Jul. 28, 2015, 32 pgs.
Schonleber, Martin; Issue Notification for U.S. Appl. No. 13/525,184, filed Jun. 15, 2012, dated Oct. 26, 2016, 1 pg.
Schonleber, Martin; Non-Final Office Action for U.S. Appl. No. 13/525,184, filed Jun. 15, 2012, dated Feb. 25, 2014, 16 pgs.
Schonleber, Martin; Non-Final Office Action for U.S. Appl. No. 13/525,184, filed Jun. 15, 2012, dated Dec. 31, 2015, 21 pgs.
Schonleber, Martin; Non-Final Office Action for U.S. Appl. No. 13/525,184, filed Jun. 15, 2012, dated Feb. 19, 2015, 21 pgs.
Schonleber, Martin; Notice of Allowance for U.S. Appl. No. 13/525,184, filed Jun. 15, 2012, dated Jul. 12, 2016, 21 pgs.
Schonleber; German Examination Report for serial No. DE102011051146, filed Oct. 4, 2012, dated Jan. 19, 2012, 6 ogs.
Schonleber, Martin; Final Office Action for U.S. Appl. No. 13/667,809, filed Nov. 2, 2012, dated Sep. 16, 2013, 9 pgs.
Schonleber, Martin; Issue Notification for U.S. Appl. No. 13/667,809, filed Nov. 2, 2012, dated Feb. 25, 2015, 1 pg.
Schonleber, Martin; Non-Final Office Action for U.S. Appl. No. 13/667,809, filed Nov. 2, 2012, dated Apr. 15, 2013; 12 pgs.
Schonleber, Martin; Non-Final Office Action for U.S. Appl. No. 13/667,809, filed Nov. 2, 2012, dated Jan. 24, 2014; 8 pgs.
Schonleber, Martin; Notice of Allowance for U.S. Appl. No. 13/667,809, filed Nov. 2, 2012, dated Dec. 4, 2014, 10 pgs.
Schonleber; International Preliminary Reporton Patentability for serial No. PCT/IB2011/052048 filed May 10, 2011, dated Nov. 22, 2012, 7 pgs.
Schonleber; International Search Report and Written Opinion for serial No. PCT/IB2011/052048 filed May 10, 2011, dated Sep. 21, 2011, 12 pgs.
Michelt, Berthold; Applicant Initiated Interview Summary for U.S. Appl. No. 14/307,481, filed Jun. 17, 2014, dated Jul. 1, 2016, 3 pgs.

(56) References Cited

OTHER PUBLICATIONS

Michelt, Berthold; Applicant Interview Summary for U.S. Appl. No. 14/307,481, filed Jun. 17, 2014, dated Nov. 20, 2015, 3 pgs.
Michelt, Berthold; Final Office Action for U.S. Appl. No. 14/307,481, filed Jun. 17, 2014, dated Feb. 12, 2016, 24 pgs.
Michelt, Berthold; Issue Notification for U.S. Appl. No. 14/307,481, filed Jun. 17, 2014, dated Nov. 2, 2016, 1 pg.
Michelt, Berthold; Non-Final Office Action for U.S. Appl. No. 14/307,481, filed Jun. 17, 2014, dated Aug. 26, 2015, 41 pgs.
Michelt, Berthold; Notice of Allowance for U.S. Appl. No. 14/307,481, filed Jun. 17, 2014, dated Jul. 25, 2016, 20 pgs.
Precitec Optronic GmbH; International Search Report and Written Opinion for serial No. PCT/IB2014/062290, filed Jun. 17, 2014, dated Sep. 22, 2014, 20 pgs.
Chinese Office Action for serial No. 201380059958.1, filed Nov. 14, 2013, dated Oct. 9, 2016, 11 pgs.
German Examination Report for serial No. 102012111008.5, filed Nov. 15, 2012, dated Jun. 19, 2013, 17 pgs.
Notice of Allowance for U.S. Appl. No. 14/713,150, filed May 15, 2015, dated Feb. 9, 2017, 16 pgs.
Schonleber, Martin; International Search Report and Written Opinion for PCT/IB2013/060127, filed Nov. 14, 2013, dated Mar. 21, 2014, 27 pgs.
Schonleber, Martin; Issue Notification for U.S. Appl. No. 14/713,150, filed May 15, 2015, dated May 24, 2017; 1 pg.
Schonleber, Martin; Non-Final Office Action for U.S. Appl. No. 14/713,150, filed May 15, 2015, dated Sep. 6, 2016; 50 pgs.
Schonleber, Martin; Issue Notification for U.S. Appl. No. 15/588,021, filed May 5, 2017, dated May 9, 2018, 1 pg.
Precitec Optronik GmbH; Office Action for Japanese patent application No. 2018-197191, dated Nov. 26, 2019, 6 pgs.
Schonleber, Martin; Issue Notification for U.S. Appl. No. 15/433,173, filed Feb. 15, 2017, dated Feb. 27, 2019, 1 pg.
Precitec Optronik GmbH; Notice of Preliminary Rejection for Korean application No. 10-2018-0134156, dated Jun. 19, 2019, 11 pgs.
Dietz, Christoph; Non-Final Office Action for U.S. Appl. No. 16/361,955, filed Mar. 22, 2019, dated May 23, 2019, 43 pgs.

* cited by examiner

DISTANCE MEASURING DEVICE

CROSS-REFERENCE TO RELATED APPLICATION

This application claims the benefit of German Patent Application No. DE 10 2017 126 310.1, filed on Nov. 9, 2017, which is hereby specifically incorporated by reference herein in its entirety.

TECHNICAL FIELD

The invention relates to an optical distance measuring device, in particular an optical distance measuring device operated with a broad-band light source, and a corresponding distance measurement process for measuring distances and differences in distance, in particular for monitoring the thickness of a semiconductor wafer during semiconductor wafer thinning.

BACKGROUND

There are known optical distance measuring devices with broad-band light sources which make it possible to ascertain distances and differences in distance to and between surfaces and boundaries of a sample using reflection spectra of a broad-band light. With distance measuring devices of this kind which are based on ascertaining reflection spectra of a broad-band light, a distinction is made between distance measuring devices with OCT (Optical Coherence Tomography) or spectral interferometric configuration and those with chromatic confocal configuration, depending on the measurement process used. Patent specification DE 10 2010 016 862 B3 describes the use of the spectral interferometric measurement principle for a scanning distance measurement. Patent specification DE 103 25 942 B4 describes the use of the chromatic confocal measurement principle in the measurement of the thickness of a transparent body.

The known distance measuring devices are unsuitable or of limited suitability for monitoring the thickness of semiconductor wafers during semiconductor wafer thinning. In particular, grinding particles and released wafer particles can impair the measurements and even cause damage to the measuring device.

A device with a liquid-tight light-emitting region and a liquid nozzle for rinsing away impurities is known from publication DE 10 2007 048 295 A1. However, this device is prone to failure and the reliability and accuracy of its distance measurements are therefore impaired.

SUMMARY

The object of this invention is to provide an improved distance measuring device, which is characterized by a simple design and low failure-proneness.

To achieve this object a measuring head of a distance measuring device according to a first aspect is provided, the measuring head comprising an optical measuring system for carrying out an optical measurement process on a measurement object by means of a measuring light beam formed from a broad-band measuring light. A light emitted by a broad-band light source intended for this purpose can, in particular, be used as the broad-band measuring light.

The measuring head comprises a liquid guide with a liquid inlet and with a liquid outlet for producing a jet of liquid directed at the measurement object, the liquid guide being designed such that in certain sections at least the measuring light beam runs essentially along the jet of liquid.

The measuring head further comprises a flow element with a laminar flow channel, the flow element being designed such that the at least one measuring light beam is able to reach the measurement object by passing through the laminar flow channel, in particular along the laminar flow channel. Because the measuring light beam runs along the jet of liquid, the measuring light beam can be kept free of disruptive impurities in a targeted and thus efficient manner. The provision of the flow element with the laminar flow channel allows liquid turbulence along the measuring light beam to be suppressed or reduced. The jet of liquid can thus be de-swirled or laminarized such that it continues to act to largely as a homogenous optical medium even at high flow rates. In particular, this enables disruptive density gradients and air-liquid transitions to be avoided or reduced, thereby making it possible to increase both measurement accuracy and measurement reliability. In particular, it makes it possible to increase the flow rate of the jet of liquid without the jet of liquid breaking up into droplets and so without the measurements being significantly impaired by the air-liquid transitions which this would create.

The optical measuring system can be designed to carry out a spectral-interferometric and/or chromatic-confocal distance measurement process. The optical measuring system can, in particular, be designed to ascertain or to monitor the thickness of a semiconductor wafer during semiconductor wafer thinning or during wet-grinding. Depending on measurement requirements and applications, these two optical configurations can sometimes be used in a complementary manner. In these processes, in particular, the light reflected back from the measurement object can be acquired by a spectrometer or a photodetector (in particular in the case of an adjustable light source) and evaluated by an evaluation unit using a spectral-interferometric or chromatic-confocal process in order to ascertain the thickness of the semiconductor wafer or to monitor it during the grinding process. In particular, the optical measuring system can be designed as a chromatic-confocal optical measuring system with a measuring range of between 1.5 mm and 3.0 mm, in particular between 2.2 mm and 2.4 mm. Such measuring ranges are suitable, in particular, for monitoring a semiconductor wafer thinning the process of thinning.

The use of the flow element with the laminar flow channel also makes it possible to expand the water outlet, making it possible, in particular to use the optical measuring system with a high numerical aperture. This makes it possible, in particular, to increase the measurement accuracy of the chromatic distance measurement.

The liquid outlet can be designed such that the jet of liquid is able to exit the measuring head essentially coaxially with the measuring light beam, in particular perpendicular to the measurement surface of the measurement object. Due to the coaxial arrangement of the measuring light beam and the jet of liquid it is possible to ensure that the light path of the measuring light beam runs essentially through the liquid, which is largely free of grinding particles, or through the rinsing liquid. Due to the perpendicular arrangement of the jet of liquid in relation to the measurement surface, the rinsing liquid is able to spread to all sides of the measurement surface, thus allowing the abrasive particles and other process residues to be rinsed out of the light path of the measuring light beam to all sides.

The liquid outlet can be designed as a nozzle opening of a nozzle having a nozzle chamber and the flow element can be designed as a nozzle chamber insert. In this way the flow element can be integrated simply into the measuring head. The flow element can be designed in the form of a hollow cylinder oriented essentially coaxially to the measuring light beam with an at least partially liquid-permeable wall. The liquid is able to flow through the at least partially liquid-permeable wall into the interior of the hollow cylinder, thereby favoring a laminar flow inside the hollow cylinder and allowing the interior of the hollow cylinder to function as a laminar flow channel.

The at least partially liquid-permeable wall can, in particular, have radial holes or wall holes that are arranged symmetrically in relation to the cylinder axis or the axis of symmetry of the cylinder. The symmetrical arrangement of the radial holes has the effect of suppressing or reducing the development of swirl favorable to turbulence when the liquid flows into the laminar flow channel, thereby making it possible to increase the stability of the jet of liquid flowing out of the laminar flow channel. In particular, this makes it possible to prevent the premature disintegration of the jet of liquid.

The wall can, in particular, be designed to be at least partially porous or have a porous material. Due to the porosity of the wall it is possible to achieve a homogenous or even radial inflow of the liquid from all sides into the laminar flow channel so as to reduce the maximum inflow speed at which the liquid enters the laminar flow channel. This reduction of the inflow speed favors, in particular, the formation of the laminar flow in the laminar flow channel such that the flow rate or flow speed of the jet of liquid can be increased without impairing the integrity or the optical characteristics of the jet of liquid. In addition, the porous wall of the flow element can function as a liquid filter which prevents any particles washed through the liquid inlet into the liquid guide from reaching the measuring light beam.

The flow element can be any flow element produced by means of a sintering process. In particular, the flow element can be designed as a sintered hollow cylinder made of metal particles. In this process metal or metallic particles or sinter particles are baked together in a sintering process so as to form a cohesive porous material. The sintering process permits the production of a flow element with the desired porosity from metal particles in a controlled manner. The production process can, in particular, comprise a furnace step under pressure during which the sinter particles are compacted in a correspondingly shaped tool. The pore size of the flow element can be adjusted by means of the metal particle size and the pressure selected during the furnace step.

The selected porosity of the flow element can be within a range of 10% to 40%, in particular 15% to 30%. A porosity range between 10% and 40%, in particular between 15% and 30%, is characterized by high liquid permeability at high liquid flow uniformity which means that the laminar flow can be maintained even at a high liquid flow rate.

The sinter particles and metal powder or metal particles can have a diameter of between 20 μm and 200 μm, in particular of between 50 μm and 100 μm. Powder particles of this size are particularly suitable for combining a low pore size favoring laminar flow with high wall porosity or with high liquid permeability.

The sinter particles can essentially be of equal size. The equal-sized particles can be baked together during the sintering process in such a way that essentially all the particles are linked or combined together. This helps, in particular, to reduce the probability of the rinsing liquid being contaminated by detached sinter particles.

The optical measuring system can comprise a deflection mirror. In particular, it is possible to arrange in the beam path of the optical measuring system a deflection mirror that splits the beam path into two sections oriented at 90° to one another. By providing the deflection mirror in the measuring head, it is possible to achieve a particularly compact measuring head design. In particular, it is thus possible to achieve a particularly low measuring head design height whilst also arranging the liquid supply and the light supply parallel to one another. In this way the measuring head can easily be integrated into a wafer processing machine, particularly into a wet-grinding machine.

According to a second aspect, a distance measuring device with at least one measuring head is provided according to the first aspect, the distance measuring device further having an optical unit for feeding a broad-band light into the measuring head and for decoupling a measuring light reflected back from a measurement object. The optical unit can be designed such that it can be connected liquid-tight to the measuring head. In particular, the optical unit can have a housing that is connected liquid-tight to the measuring head.

Due to the liquid-tight connection of the optical unit it is possible ensure that the working or rinsing liquid is unable to damage the optical measuring system and impair the measurements.

The optical unit can have a fiber connection for connecting a multimode fiber provided with a sheath to the measuring head, the sheath being positioned adjacent to the multimode fiber to receive an air supply hose. Air can be supplied simply to the optical measuring system by the air supply hose with the aid of the multimode fiber connection.

The sheath can further be designed such that it contains a free space not occupied by the multimode fiber or the air supply hose. Thanks to this free space, air can be supplied simply to the optical measuring system with the aid of the multimode fiber connection.

The fiber connection can be designed as a plug with strain relief. This allows the build-up of strain in the multimode fiber to be suppressed or reduced.

The at least one measuring head of the distance measuring device can comprise a first measuring head for acquiring a distance to a surface of a semiconductor wafer and a second measuring head for acquiring a distance to a contact surface adjacent to an edge of the semiconductor wafer. Using the distance ascertained by means of the first measuring head and the second measuring head, it is possible to ascertain simply the absolute thickness of the semiconductor wafer as a difference in distance.

According to a further aspect, a process is provided for acquiring a distance relating to a measurement object. The process comprises the following steps:
  the emission from at least one measuring head comprising an optical measuring system of at least one measuring light beam formed from a broad-band light in order to carry out an optical measurement process on a measurement object,
  the production by means of a liquid guide of a jet of liquid directed at the measurement object, the liquid guide being designed such that in certain sections at least the measuring light beam runs along the jet of liquid through the liquid, and
  the evaluation of the components of the measuring light beam reflected by the measurement object to ascertain the distance relating to the measurement object, the liquid guide comprising a flow element with a laminar flow channel and the at least one measuring light beam reaching the measurement object by passing through the laminar flow channel of the flow element.

The process can, in particular, be carried out with one of the distance measuring devices described above. The jet of liquid can be de-swirled by the laminar flow channel such that it continues to act largely as a homogenous optical medium even at high flow rates. In particular, this enables disruptive density gradients and air-liquid transitions to be avoided or reduced, thereby making it possible to increase both measurement accuracy and measurement reliability.

The process can be carried out, in particular, on a semiconductor wafer as a measurement object for monitoring the thickness of the semiconductor wafer during semiconductor wafer thinning, in particular during semiconductor wafer wet-grinding.

Water, in particular deionized water, can be used as the liquid. Deionized water is routinely used as a rinsing agent in the semiconductor industry. In addition, deionized water has a low absorption coefficient and advantageous refractive characteristics.

In the process the at least one measuring light beam can comprise a first measuring light beam emitted from a first measuring head to acquire a distance to a surface of a semiconductor wafer and a second measuring light beam emitted from a second measuring head to acquire a distance to a contact surface adjacent to an edge of the semiconductor wafer, it also being possible for the process to comprise the evaluation of the components of the first measuring light beam and the second measuring light beam reflected by the measurement object.

Using the distances ascertained by means of the first measuring head and the second measuring head, it is possible to ascertain simply the thickness of the semiconductor wafer as a difference between distances.

The jet of liquid can have a flow speed or flow rate of over 1.5l/m, in particular over 2 l/m. By increasing the flow to over 1.5l/m or over 2 l/m, disruptive impurities can be efficiently rinsed out of the light path without significantly impairing the optical properties of the jet of liquid in the process.

BRIEF DESCRIPTION OF THE DRAWINGS

The embodiments are explained in greater detail below with reference to the drawings, identical reference numerals being used to indicate identical or comparable components.

DETAILED DESCRIPTION

Figure 1:
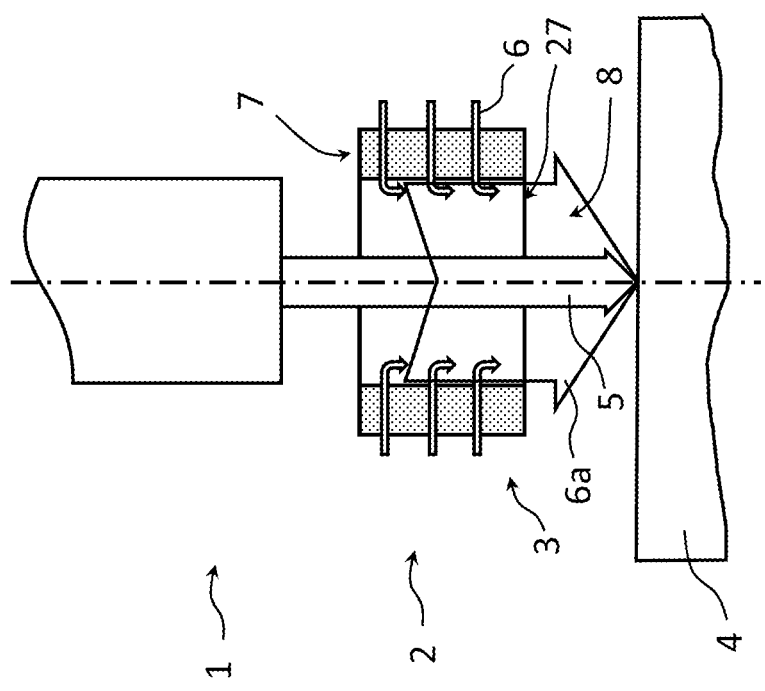
FIG. 1 shows schematically a measurement configuration of a distance measuring device according to one embodiment.

FIG. 1 shows schematically a measurement configuration of a distance measuring device according to one embodiment. It shows, in particular, an optical measuring system 1 for carrying out an optical measurement process, a liquid guide 2 with a flow element 3 and a measurement object 4 on which the optical measurement process can be carried out. In addition, FIG. 1 also shows symbolically as a wide arrow a measuring light beam 5 extending from the optical measuring system 1 to the measurement object 4. The measuring light beam 5 is formed by the optical measuring system 1 from a broad-band measuring light originating in a broad-band light source (not shown). FIG. 1 also shows flow lines 6 in the form of curved arrows to illustrate the liquid flow.

In the example shown in FIG. 1 the optical measuring system 1 is designed to carry out a chromatic distance measurement process. In other embodiments the optical measuring system can be designed to carry out a spectral-interferometric distance measurement process.

The flow element 3 is designed in the form of a hollow cylinder with an at least partially liquid-permeable wall 7, the interior of the hollow cylinder forming a laminar flow channel 8 or a laminar flow channel. The flow element 3 is arranged such that the measuring light beam 5 is able to extend through the laminar flow channel 8 of the flow element 3 to the measurement object 4. As illustrated by the flow lines 6, the liquid flows radially from outside through the wall 7 of the flow element 3 into the laminar flow channel 8, in which it flows along the measuring light beam 5 towards the measurement object 4.

Figure 5:
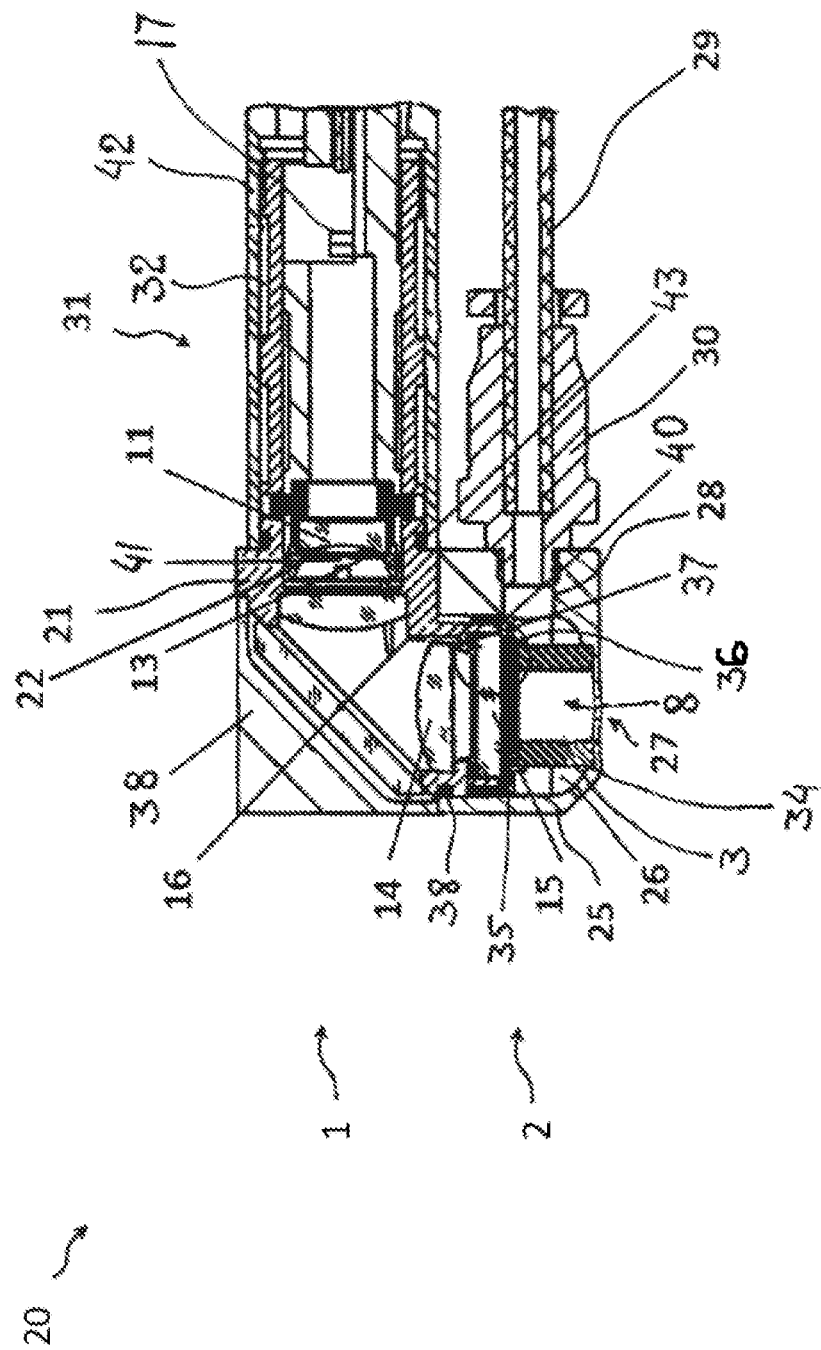
FIG. 5 shows a schematic cross-section of a measuring head of a distance measuring device according to one embodiment.

As also discussed with regard to FIG. 5, the liquid flowing into the laminar flow channel 8 is only able to leave the laminar flow channel 8 in the direction of a nozzle opening (liquid outlet) 27, defined at an end of the flow element 3. The nozzle opening (liquid outlet) 27 is configured to direct the liquid out of the laminar flow channel 8 as a jet 6a, such that the jet of liquid 6a exits the measuring head 20 (FIG. 5) coaxially with the measuring light beam 5, in particular perpendicular to the measurement surface of the measurement object 4. The jet of liquid 6a is thus able to rinse away the impurities present on the surface of the measurement object 4 or in the working liquid such that measurement is not impaired by the impurities.

The measurement configuration shown in FIG. 1 result, in particular, in the reduction or suppression of liquid turbulence on the light path of the measuring light beam 5, thereby making it possible to increase the reliability and precision of the optical measurements. In particular, the flow element 3 ensures the creation of an even laminar flow in the liquid along the measuring light beam 5. As a result of the creation of the laminar flow in the laminar flow channel 8, it is possible to increase the flow rate or the flow speed of the liquid in the liquid guide 2 at which turbulence occurs in the liquid flow, thus making it possible to carry out optical measurements at high flow rates. By reducing turbulence it is possible, in particular, to achieve a bubble or droplet-free, essentially continuous flow of liquid along the measuring light beam between the optical measuring system and the measurement object, thereby making it possible to carry out series of measurements without or with only few rogue results. This has been verified in a plurality of measurement series at differing flow speeds during which it was possible to achieve a considerable improvement in measurement accuracy in addition to reducing the number of rogue results to practically zero.

Figure 2:
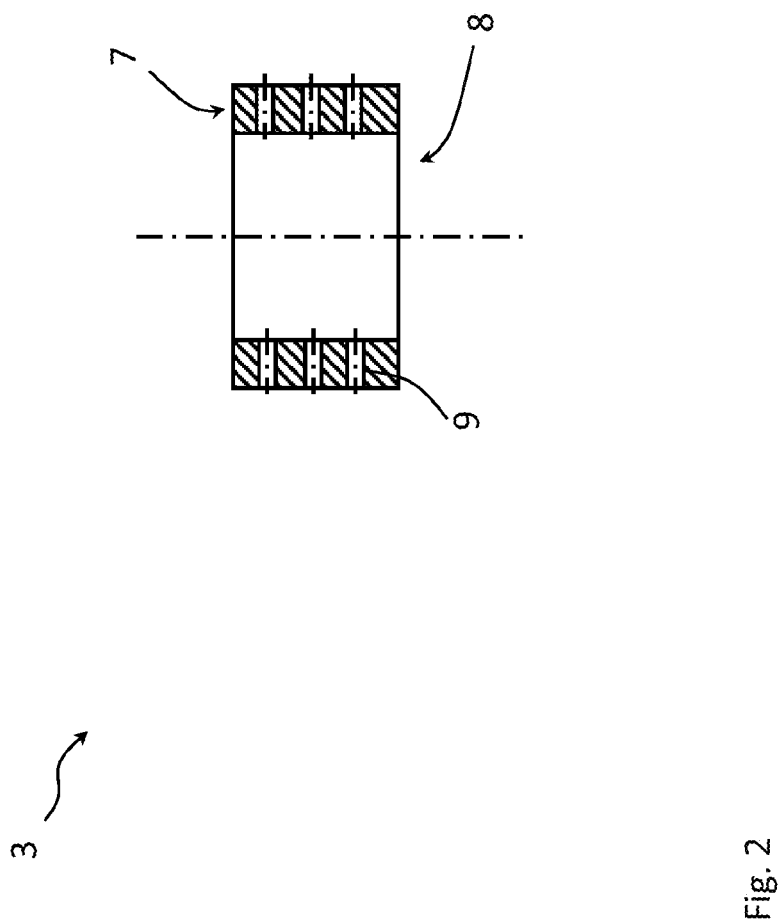
FIG. 2 shows a schematic cross-section of a flow element according to one embodiment.

FIG. 2 shows a schematic cross-section of a flow element according to one embodiment. Like the flow element illustrated in FIG. 1, the flow element is designed in the form of a hollow cylinder with a liquid-permeable wall 7. The wall 7 has wall holes 9 through which the liquid is able to flow into the laminar flow channel 8. The wall holes 9 are distributed essentially symmetrically over the wall 7 and are oriented radially in relation to the axis of symmetry of the hollow cylinder.

The symmetrical arrangement of the wall holes 9 means that no or little swirl develops as the liquid flows into the laminar flow channel 8. It is thus possible to avoid the formation of turbulence caused by swirl and so the resulting premature disintegration of the jet of liquid directed at the measurement object.

Figure 3:
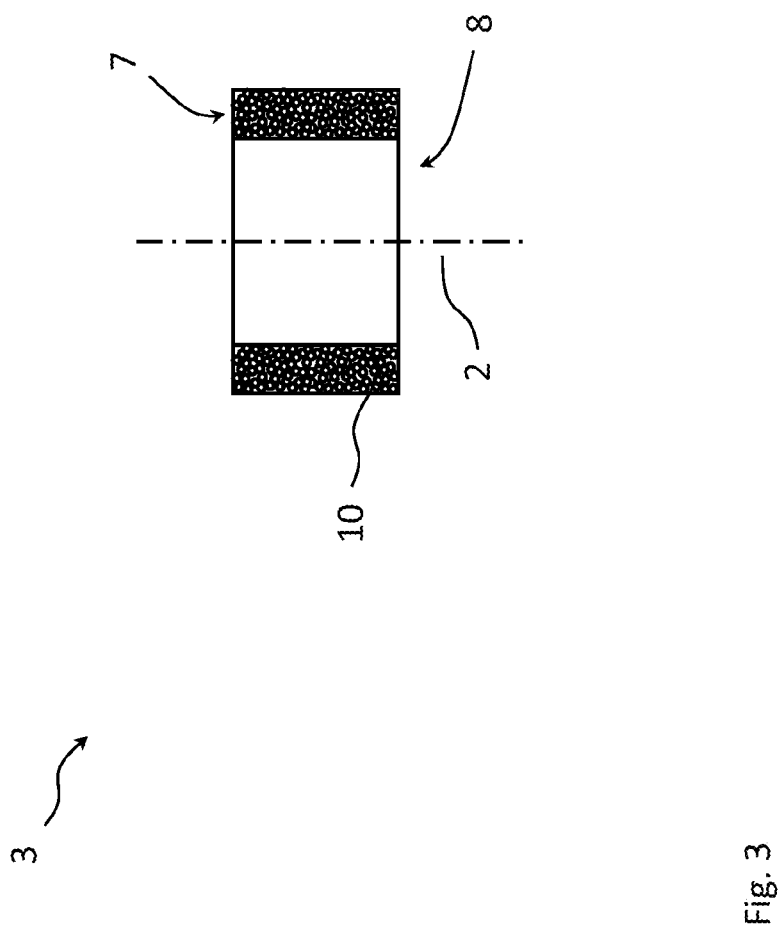
FIG. 3 shows a schematic cross-section of a flow element according to one embodiment.

FIG. 3 shows a schematic cross-section of a flow element according to one embodiment. Like the flow elements shown in FIGS. 1 and 2, the flow element is designed in the form of a hollow cylinder with a liquid-permeable wall 7. In this embodiment the wall 7 is porous in design or features pores through which the rinsing liquid is able to flow into the laminar flow channel 8. The wall 7 has essentially even porosity and the liquid is therefore able to flow evenly radially from all sides into the laminar flow channel without developing swirl and favoring turbulence.

In this embodiment the wall porosity is 30%. Depending on the flow rate required, wall porosity can be chosen from a range of 10% to 35%. The choice of a wall porosity within this range can be particularly favorable to the development of a laminar flow in the laminar flow channel. This porosity range is characterized, in particular, by high liquid permeability at high liquid flow uniformity and means that the laminarity of the flow can be maintained even at high liquid flow rates.

The hollow cylinder has an external diameter of 10 mm, an internal diameter of 6 mm and a height of 6.5 mm. The aspect ratio of the hollow cylinder or the height to internal diameter ratio is 1:8 and the wall thickness of the hollow cylinder is 10 mm, 6.5 mm and 2 mm accordingly. In other embodiments the aspect ratio of the flow element can be adjusted to the optical measuring system so that the measuring range essentially lies completely outside the flow element 3.

The aspect ratio of the interior of the hollow cylinder is thus 1:62. The aspect ratio is adapted to the numerical aperture of the measuring heads such that the measuring range, in particular when using a cover glasses or protective glass des measuring head, essentially lies completely outside the hollow cylinder. The wall thickness of the hollow cylinder can lie in a range of 1.0 mm to 3.0 mm, in particular between 1.5 mm and 2.5 mm. Such wall thicknesses allow the hollow cylinder to be adapted to the numerical aperture of the optical measuring system while at the same time achieving a sufficient degree of flow laminarization. The cover glass selected can have a diameter of over 10 mm, in particular between 14 mm and 25 mm. This makes it possible, in particular, to achieve a compact measuring head design with a large numerical aperture.

The flow element in FIG. 3 can be produced metallurgically using a sintering process, in particular the flow element can be designed as a sintered hollow cylinder made of metal particles. In this case, metal particles are baked together in a sintering process so as to form a cohesive porous material. FIG. 3 schematically shows the metal particles or sinter particles 10 as small circles. In a preceding step the sinter particles can be sieved to restrict the size distribution of the sinter particles. This restriction of particle size distribution before sintering can be achieved, in particular, by permanently binding together essentially all the sinter particles after the sintering process. In addition to the stability of the porous material, this also, in particular, reduces the probability of a sinter particle detached from the flow element 3 contaminating the rinsing liquid or causing optical disruption during a measurement process. By appropriate control of the temperature and the baking time during sintering it is possible to ensure that all metal particles are at essentially the same temperature, thereby ensuring that the metal particles melt equally well or essentially simultaneously. The production process can comprise a process step under pressure in which the particles are compacted in a corresponding shaped tool. The restricted particle size distribution means that essentially all particles come into contact with their neighboring particles. The pore size can be influenced or adjusted by the size of the metal particles or the powder particles and the pressing force. After compacting, the part molded from the sinter particles is sintered in a special furnace.

Figure 4:
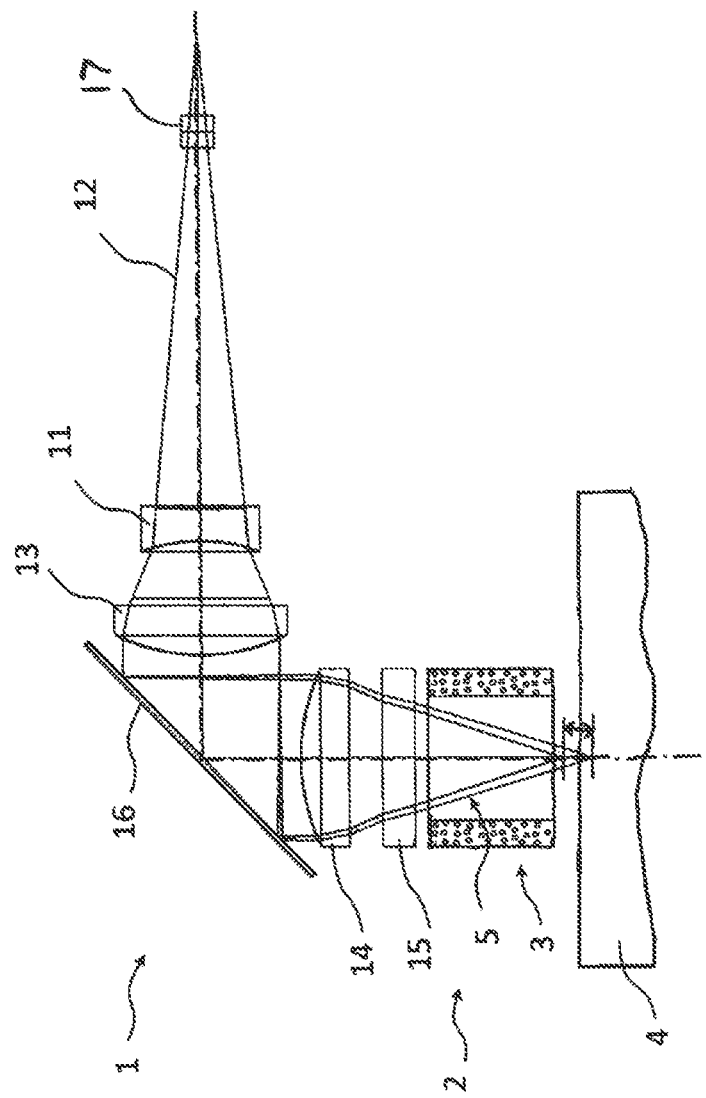
FIG. 4 shows schematically a measurement configuration of a distance measuring device with a chromatic optical measuring system according to one embodiment.

FIG. 4 shows schematically a measurement configuration of a distance measuring device with a chromatic optical measuring system according to one embodiment. FIG. 4 illustrates schematically an optical measuring system 1, a liquid guide 2 with a flow element 3 and a measurement object 4. The optical measuring system 1 comprises a diffuser lens 11 for expanding a beam of broad-band light 12, a first collector lens 13 and a second collector lens 14 for forming a tapering measuring light beam 5. The optical measuring system 1 also has a light emission window 15 and a deflection mirror 16. At least one of the optical elements used in the optical measuring system 1, in particular the first collector lens 13 and the second collector lens 14, shows marked chromatic aberration and broad-band measuring light can therefore be collimated by the optical measuring system 1 to a focus region or measuring range spatially extended along an optical axis of the optical measuring system 1. The optical axis is shown as a dash-dotted line. In FIG. 4 the measuring range is illustrated by a double-headed arrow. In this embodiment the optical measuring system 1 is designed for measuring in a measuring range of 2.0 mm and for a spectral range of the broad-band measuring light of 450 nm to 800 nm.

The light emission window 15 or cover glass is fitted liquid-tight and protects the optical measuring system against liquid penetration.

The deflection mirror 16 or 90° mirror is arranged such that the broad-band light undergoes a 90° deflection between the first collector lens 13 and the second collector lens 14. Due to the deflection of the broad-band light by the 90° mirror it is possible to achieve a particularly compact distance measuring device design with a low design height. As can be seen from FIG. 4, the light refraction in the cover glass has the effect of reducing the effective numerical aperture of the optical measuring system, making it possible to extend the laminar flow channel. In addition, a chromatic glass adapted for the collector lenses 13 and 14 can be provided as the cover glass in order to strengthen the chromatic effect of the optical measuring system. The optical measuring system 1 further comprises a beam splitter 17, which enables at least part of the light reflected back by the measurement object 4 to be directed at a spectrometer.

FIG. 5 shows a schematic cross-section of a measuring head of a distance measuring device according to one embodiment. Accommodated in the measuring head 20 of the distance measuring device shown in FIG. 5 is an optical measuring system 1 and a liquid guide 2 with a flow element according to the measurement configuration shown in FIG. 4. The measuring head 20 comprises a measuring head frame 21 or measuring head housing shaped like a beveled rectangular solid, which is designed to receive individual optical components of the optical measuring system 1. The optical measuring system 1 comprises a diffuser lens 11 for expanding a beam of broad-band light, a first collector lens 13 and a second collector lens 14 for forming a tapering measuring light beam. The optical measuring system 1 further comprises a light emission window 15 in the form of a cover glass and a deflection mirror 16. The first collector lens 13 and the second collector lens 14 show marked chromatic aberration and the broad-band measuring light can therefore be collimated by the optical measuring system 1 to a focus range or measuring range spatially extended along the optical axis of the optical measuring system 1.

The diffuser lens 11 is mounted in a lens mount 22, which is fixed to the measuring head frame 21 by a lens screw connection 41. The light emission window 15 is sealed liquid-tight onto the measuring head frame 21 by means of a seal 37 in the form of an O-ring.

The liquid guide 2 has a nozzle 25 with an essentially axially symmetrical nozzle chamber 26 and with a nozzle opening (liquid outlet) 27 for forming a jet of liquid. The nozzle 25 is designed as a top part on the measuring head frame 21, which is placed on the measuring head frame 21 from the side of the light emission window 15. The nozzle chamber 26 has an inlet 28 in the form of a lateral or radial opening of the nozzle chamber 26, to which a liquid supply hose 29 is connected with a screw connection 30. The diameter of the nozzle opening (liquid outlet) 27 can be in a range of 2 mm to 6 mm. The diameter of the nozzle opening (liquid outlet) 27 is 3 mm.

The deflection mirror 16 or 90° mirror is arranged such that the broad-band light undergoes a 90° deflection between the first collector lens 13 and the second collector lens 14. In one embodiment the deflection mirror 16 is mounted liquid-tight on the measuring head frame 21 such that it can be adjusted.

The measuring head 20 comprises an adjustable optical unit 31 with a fiber feed 32 for receiving a multimode fiber (not shown). The multimode fiber can be connected to the optical unit 31 by a plug. The plug can be designed, in particular, as a fiber plug with strain relief. The optical unit 31 further comprises a beam splitter 17 by means of which at least part of the light reflected back from the measurement object can be directed towards a spectrometer.

A liquid supply hose 29 is screwed to the inlet 28 of the nozzle chamber 26. The liquid supply hose 29 is oriented essentially parallel to the optical unit 31. The parallel orientation of the liquid supply hose 29 and the optical unit 31 permits a flat or space-saving design of the measuring head, which is favored by the deflection mirror 16 in the beam path between the first collector lens 13 and the second collector lens 14.

The fiber feed 32 can have a sheath (not shown), which encloses an air supply hose for supplying air to the optical measuring system 1 and a free space the length of the sheath as well as the multimode fiber. Here the free space can serve as an air discharge line. Thus it is possible to supply air to and discharge air from the optical measuring system simply with one single hose.

The nozzle chamber 26 has a recess 34 for accommodating the flow element 3. The flow element 3 is arranged coaxially with the nozzle chamber 26. Here the liquid flowing into the nozzle chamber 26 through the inlet 28 is able to surround the flow element 3 laterally such that it is able to flow into the laminar flow channel 8 radially from all sides through the liquid-permeable wall of the flow element 3. One end of the laminar flow channel 8 is fixed to the light emission window 15 with a retaining ring 35 and sealed such that the liquid flowing into the laminar flow channel 8 is only able to leave the laminar flow channel 8 in the direction of the nozzle opening (liquid outlets) 27, essentially through the end of the flow element 3 facing away from the light emission window 15.

The nozzle 25 is designed such that the flow element 3 is sealed from the inner wall of the nozzle chamber 26 by a seal 36 on the retaining ring 35. The retaining ring 35 presses against the light emission window 15, thereby sealing the light emission window 15 with a seal 37 on the measuring head frame. In this manner both the end of the flow element 3 facing the light emission window 15 and the optical measuring system 1 can be additionally sealed by the light emission window 15 as additional fixing means. This makes it possible to reduce the number of air inclusion points likely to release air bubbles into the liquid, thus impairing the measurements.

The measuring head 20 has a mirror cover 38, which covers the deflection mirror 16 from the outside and is able to protect it from external influences.

The optical unit 31 comprises a housing 42 that is sealed liquid-tight by means of a seal 43 in relation to the measuring head frame 21.

Figure 6:
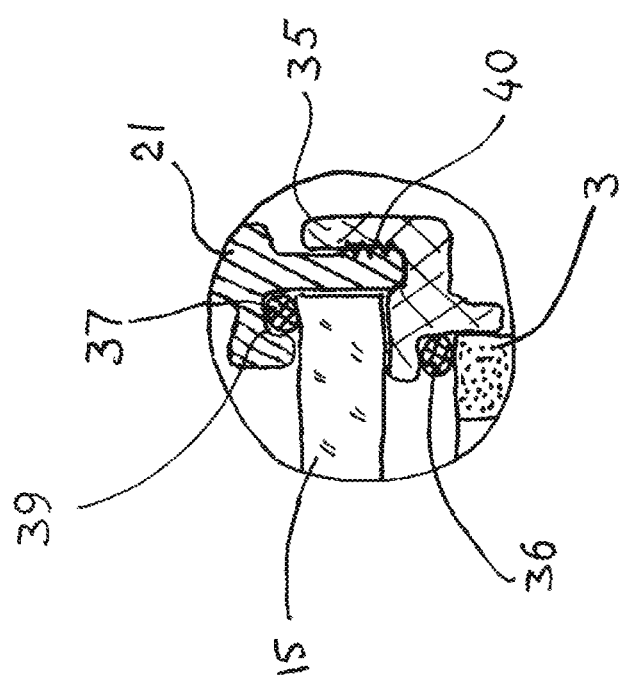
FIG. 6 shows an enlarged section from FIG. 5.

FIG. 6 shows an enlarged view of a section of FIG. 5. In particular, the enlarged representation given in FIG. 6 illustrates, in particular, the mounting of the retaining ring 35 to retain and seal the light emission window 15 and the flow element 3. The measuring head frame 21 has a circular groove 39 for receiving the seal 37, which is designed as an O-ring, the seal 37 being pressed into the circular groove 39 from the light emission window 15. The retaining ring 35 serves as a connector between the flow element 3 and the light emission window 15 and ensures the coaxial orientation of these elements, thereby sealing the retaining ring 35 with the seal 36 on an end face of the flow element 3. In this embodiment the retaining ring 35 is screwed to the measuring head frame 21 by a screw connection 40. In other embodiments the retaining ring 35 is dimensioned to fit exactly such that the retaining ring 35 is able to hold both the light emission window 15 and the flow element 3 without additional fixing means.

The measuring head 20 is easy to assemble. In a first step the measuring head frame 21 can be provided essentially in the form of a beveled hollow rectangular solid, the measuring head frame 21 being shaped to receive the optical measuring system components. In particular, the measuring head frame 21 can have openings and recesses for receiving the first collector lens 13, the second collector lens 14, the deflection mirror 16, the lens mount 22 and the light emission window 15. The first collector lens 13 and the second collector lens 14 can be in introduced into the measuring head frame 21 through the opening provided on the beveled side of the measuring head frame 21 designed to receive the deflection mirror 16 or through a lateral opening and placed in a corresponding recess inside. The deflection mirror 16 can be fixed to the beveled side of the measuring head frame 21 and sealed with an adhesive, in particular with a silicon adhesive. The diffuser lens 11 can be inserted into the lens mount 22 and fixed to the measuring head frame from outside by a lens screw connection 41.

The light emission window 15 or cover glass can be mounted on the measuring head frame 21 and fixed with the retaining ring 35. The seal 36 for sealing the flow element 3 can be placed in the retaining ring 34, after which the flow element 3 can be inserted into the retaining ring 35 as shown in FIG. 6.

The optical unit 31 can be provided with the housing 42 and sealed liquid-tight to the measuring head frame 21 with a seal 43.

When a measuring device according to one of the embodiments is in operation, a jet of liquid 6a (FIG. 1) issuing from the nozzle opening (liquid outlets) 27 is generated by means of the liquid guide 2 and is able to rinse away any processing residues generated by the processing of the measurement object 4 (FIG. 1) such that the measuring light beam 5 (FIG. 1) passes through the liquid essentially free of processing residues. The flow element 3 with the laminar flow channel 8 makes it possible to achieve high flow rates or flow speeds without impairing the integrity and the optical properties of the jet of liquid 6a.

In some embodiments the distance measuring device can have a first measuring head for acquiring a distance from a surface of a semiconductor wafer and a second measuring head for acquiring a distance from a contact surface adjacent to an edge of the semiconductor wafer. Thanks to a measurement configuration of this type it is possible, in particular, to determine exactly or monitor the absolute thickness of the semiconductor wafer during processing, in particular during semiconductor wafer thinning.

Although the preceding description shows at least one exemplary embodiment, it is possible to make various changes and modifications. The embodiments specified are merely examples and are not intended to limit the scope of validity, applicability or configuration of this disclosure in any way. In fact, the preceding description provides the person skilled in the art with a plan for implementing at least one exemplary embodiment, it being possible to make numerous changes in the function and arrangement of the elements described in an exemplary embodiment without leaving the scope of the attached claims and their legal equivalents.

KEY TO REFERENCE NUMERALS

1 Optical measuring system
2 Liquid guide
3 Flow element
4 Measurement object
5 Measuring light beam
6 Flow line
6a Jet of liquid
7 Wall of the flow element
8 Laminar flow channel
9 Wall hole
10 Sinter particle
11 Diffuser lens
12 Broad-band light beam
13 First collector lens
14 Second collector lens
15 Light emission window
16 Deflection mirror
17 Beam splitter
20 Measuring head
21 Measuring head frame
22 Lens mount
25 Nozzle
26 Nozzle chamber
27 Nozzle opening (Liquid outlet)
28 Inlet
29 Liquid supply hose
30 Screw connection
31 Optical unit
32 Fiber feed
34 Recess
35 Retaining ring
36 Seal
37 Seal
38 Mirror cover
39 Circular groove
40 Screw connection
41 Lens screw connection
42 Housing of the optical unit
43 Seal

What is claimed is:

1. A measuring head of a distance measuring device comprising:
    an optical measuring system configured to perform an optical measurement process on a measurement object by at least one measuring light beam formed from a broad-band measuring light; and
    a liquid guide having a flow element configured as a hollow cylinder oriented coaxially with the at least one measuring light beam, the hollow cylinder defined at least partially by a liquid-permeable wall, the hollow cylinder defining a laminar flow channel configured to admit the at least one measuring light beam en route to the at least one measuring light beam reaching the measurement object;
    wherein the liquid guide is configured to direct a jet of liquid through the laminar flow channel, such that at least a portion of the jet of liquid inside the laminar flow channel travels along at least a portion of the at least one measuring light beam passing through the laminar flow channel and toward the measurement object.

2. The measuring head of claim 1, wherein the optical measuring system is configured to perform one selected from the group of a spectral-interferometric and a chromatic-confocal distance measurement process.

3. The measuring head of claim 1, wherein the liquid guide defines a liquid outlet, the liquid outlet configured to direct the jet of liquid out of the measuring head coaxially with the at least one measuring light beam.

4. The measuring head of claim 3, wherein, the liquid outlet is configured as a nozzle opening of a nozzle having a nozzle chamber, and wherein the flow element is configured as a nozzle chamber insert.

5. The measuring head of claim 1, wherein the liquid-permeable wall defines symmetrically arranged radial holes.

6. The measuring head of claim 1, wherein the liquid-permeable wall is defined according to a predetermined porosity.

7. The measuring head of claim 6, wherein the predetermined porosity is within a range of 10% to 40%.

8. The measuring head of claim 7, wherein the predetermined porosity ranges from and including 15% to and including 30%.

9. The measuring head of claim 6, wherein the flow element is composed of metallic material formed from sinter particles.

10. The measuring head of claim 9, wherein the sinter particles each have a diameter of between 20 µm and 200 µm.

11. The measuring head of claim 10, wherein the diameter of each of the sinter particles ranges from and including 50 µm to and including 100 µm.

12. The measuring head of claim 9, wherein the sinter particles are substantially identical in size.

13. The measuring head of claim 1, wherein the optical measuring system comprises a deflection mirror.

14. A distance measuring device, comprising:
    at least one measuring head according to claim 1; and an optical unit configured to form a liquid-tight connection to the at least one measuring head, the optical unit further configured to feed a broad-band light into the at least one measuring head and to decouple a measuring light reflected back by a measurement object.

15. The distance measuring device according of claim 14, wherein the optical unit comprises:
   a fiber connection configured to connect a multimode fiber to the at least one measuring head; and
   a sheath positioned adjacent to the multimode fiber, the sheath configured to receive an air supply hose.

16. The distance measuring device of claim 15, wherein the sheath contains a free space not occupied by either the multimode fiber or the air supply hose.

17. The distance measuring device according of claim 16, wherein the at least one measuring head comprises a first measuring head configured to acquire a distance to a surface of a semiconductor wafer and a second measuring head configured to acquire a distance to a contact surface adjacent to an edge of the semiconductor wafer.

18. A process for acquiring a distance relating to a measurement object, the process comprising the steps of:
   emitting at least one measuring light beam from at least one measuring head in an optical measuring system, the at least one measuring light beam formed from a broad-band light and configured to perform an optical measurement process on the measurement object;
   conducting liquid from a liquid guide into a laminar flow channel of a flow element, wherein the flow element is configured as a hollow cylinder defined at least partially by a liquid-permeable wall, the hollow cylinder defining the laminar flow channel, and wherein during the conducing step, the liquid enters the laminar flow channel of the flow element through the liquid-permeable wall;
   producing, by the liquid guide, a jet of liquid directed at the measurement object, the liquid guide configured to direct the jet of liquid through the laminar flow channel; and
   admitting the at least one measuring light beam through the laminar flow channel en route to the at least one measuring light beam reaching the measurement object;
   wherein at least a portion of the jet of liquid inside the laminar flow channel travels along at least a portion of the at least one measuring light beam passing through the laminar flow channel;
   receiving a reflected light beam from the measurement object, the reflected light beam comprising components of the at least one measuring light beam; and
   ascertaining a distance relating to the measurement object.

19. The process of claim 18, wherein the measurement object is a semiconductor wafer, and wherein the process further comprises the step of monitoring a thickness of the semiconductor wafer during wet-grinding of the semiconductor wafer.

20. The process of claim 18, wherein the liquid is deionized water.

21. The process of claim 18, wherein the at least one measuring light beam comprises a first measuring light beam emitted from a first measuring head to acquire a distance to a surface of a semiconductor wafer and a second measuring light beam emitted from a second measuring head to acquire a distance to a contact surface adjacent to an edge of the semiconductor wafer, and wherein the step of ascertaining a distance relating to the measurement object comprises the step of evaluating first components of the first measuring light beam and second components of the second measuring light beam reflected by the measurement object.

22. The process of claim 18, wherein the jet of liquid has a flow speed of between 0.5 l/m and 5 l/m.

23. The process of claim 22, wherein the flow speed ranges from and including 5 l/m to and including and 3 l/m.

* * * * *